United States Patent
Hatanaka et al.

(10) Patent No.: US 9,733,519 B2
(45) Date of Patent: Aug. 15, 2017

(54) COMPOSITION FOR FORMING THERMOSET FILM HAVING PHOTO ALIGNMENT PROPERTIES

(75) Inventors: Tadashi Hatanaka, Funabashi (JP); Isao Adachi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/377,331

(22) PCT Filed: Jun. 21, 2010

(86) PCT No.: PCT/JP2010/060479
§ 371 (c)(1),
(2), (4) Date: Dec. 9, 2011

(87) PCT Pub. No.: WO2010/150748
PCT Pub. Date: Dec. 29, 2010

(65) Prior Publication Data
US 2012/0082805 A1    Apr. 5, 2012

(30) Foreign Application Priority Data

Jun. 23, 2009 (JP) .................................. 2009-148699

(51) Int. Cl.
| G02F 1/13363 | (2006.01) |
| C08L 33/06 | (2006.01) |
| G02F 1/1335 | (2006.01) |
| C08F 220/30 | (2006.01) |

(52) U.S. Cl.
CPC ........ *G02F 1/13363* (2013.01); *C08L 33/066* (2013.01); *B32B 2457/202* (2013.01); *C08F 2220/302* (2013.01); *G02F 2001/133519* (2013.01); *G02F 2001/133633* (2013.01); *G02F 2202/025* (2013.01); *Y10T 428/1005* (2015.01)

(58) Field of Classification Search
None
See application file for complete search history.

(56) References Cited

U.S. PATENT DOCUMENTS

| 5,958,648 | A | * | 9/1999 | Nishimura et al. ........ 430/270.1 |
| 6,340,506 | B1 | | 1/2002 | Buchecker et al. |
| 6,649,230 | B1 | * | 11/2003 | Seiberle et al. ............... 428/1.2 |
| 2002/0061996 | A1 | | 5/2002 | Buchecker et al. |

(Continued)

FOREIGN PATENT DOCUMENTS

| JP | A-9-118717 | 5/1997 |
| JP | A-10-310613 | 11/1998 |

(Continued)

OTHER PUBLICATIONS

International Search Report issued in International Patent Application No. PCT/JP2010/060479 dated Jul. 20, 2010.

*Primary Examiner* — Anthony J Frost
(74) *Attorney, Agent, or Firm* — Oliff PLC

(57) ABSTRACT

A material from which a cured film exhibiting high solvent resistance, liquid crystal-alignment performance, heat resistance and high transparency can be formed. A composition for forming a thermoset film having photo alignment properties, including: a component (A) that is an acrylic copolymer having a photodimerizing moiety and a thermal cross-linking moiety; and a component (B) that is a cross-linking agent.

12 Claims, 1 Drawing Sheet

(56) References Cited

U.S. PATENT DOCUMENTS

| | | | |
|---|---|---|---|
| 2003/0087045 | A1 | 5/2003 | Nakata et al. |
| 2004/0053159 | A1* | 3/2004 | Wilke ................ C08G 18/6254 |
| | | | 430/270.1 |
| 2005/0288426 | A1* | 12/2005 | Studer et al. ................. 524/555 |
| 2007/0148328 | A1 | 6/2007 | Shukla et al. |

FOREIGN PATENT DOCUMENTS

| | | |
|---|---|---|
| JP | A-2000-103937 | 4/2000 |
| JP | A-2000-119472 | 4/2000 |
| JP | A-2001-517719 | 10/2001 |
| JP | A-2002-155113 | 5/2002 |
| JP | A-2003-222868 | 8/2003 |
| JP | A-2005-37920 | 2/2005 |
| JP | A-2006-91290 | 4/2006 |
| JP | A-2008-156393 | 7/2008 |
| JP | A-2008-262074 | 10/2008 |
| JP | A-2009-521575 | 6/2009 |

* cited by examiner

[FIG. 1]
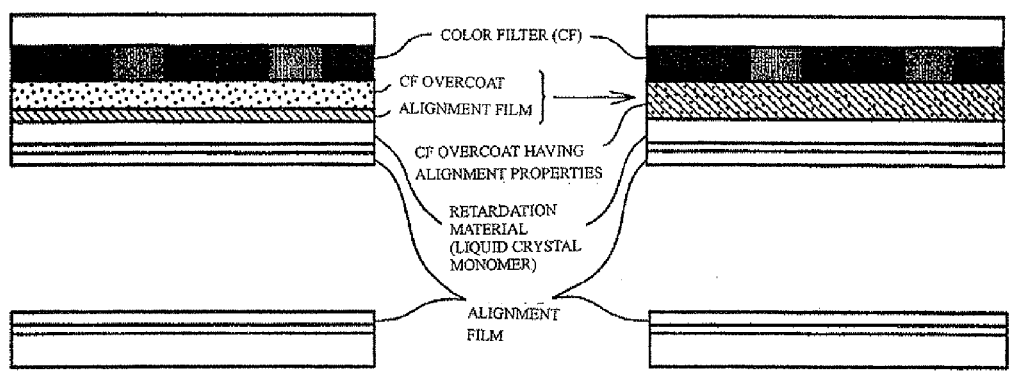

COMPOSITION FOR FORMING THERMOSET FILM HAVING PHOTO ALIGNMENT PROPERTIES

TECHNICAL FIELD

The present invention relates to a composition for forming a thermoset film having photo alignment properties and a cured film formed from the composition. More specifically, the present invention relates to a composition for forming a thermoset film having high transparency, liquid crystal alignment performance, high solvent resistance, and heat resistance in the thermoset film and applications of the thermoset film. The composition for forming a thermoset film having photo alignment properties of the present invention is especially suitable for a color filter overcoating agent having a polymerizable liquid crystal alignment function for forming a built-in retardation layer in a liquid crystal display.

BACKGROUND ART

Commonly, optical devices such as a liquid crystal display device, an organic EL (electroluminescent) device, and a solid image sensing device are provided with a protective film in order to prevent a device surface from exposing to a solvent or heat during a production process. The protective film is required not only to have high adhesiveness to a substrate to be protected and high solvent resistance but also to have excellent properties such as heat resistance.

In addition, when such a protective film is used as a protective film for a color filter that is used in a color liquid crystal display apparatus or a solid image sensing device, the film is required to have high transparency in order to maintain the transmittance of light that transmits through the color filter.

Meanwhile, in recent years, the introduction of a retardation material into a cell in a liquid crystal display has been studied for cost reduction and weight reduction. For such a retardation material, a material is typically used that is obtained by applying, aligning, and photo-curing a polymerizable liquid crystal solution. In order to align the retardation material, an underlayer film is required to be a material having alignment properties after rubbing process or polarized UV exposure. To address this, on an overcoat for a color filter, a liquid crystal alignment layer is formed, and then the retardation material is formed (see FIG. 1A). The formation of a film serving as both the liquid crystal alignment layer and the overcoat for a color filter (see FIG. 1B) will achieve great advantages such as cost reduction and reduction in the number of processes. Hence, there is a strong demand for a material serving as both the liquid crystal alignment layer and the overcoat.

Typically, for the overcoat for a color filter, an acrylic resin having high transparency is used. For dissolving the acrylic resin, glycol solvents such as propylene glycol monomethyl ether and propylene glycol monomethyl ether acetate; ester solvents such as ethyl lactate and butyl lactate; and ketone solvents such as cyclohexanone and methyl amyl ketone are widely used from the viewpoints of handling properties and coating properties. Such an acrylic resin is subjected to thermal curing or photo curing to increase heat resistance and solvent resistance (Patent Documents 1 and 2). The related-art thermosetting or photocurable acrylic resin has appropriate transparency and solvent resistance, but an overcoat composed of this kind of acrylic resin cannot achieve sufficient alignment properties even by the rubbing process or polarized UV exposure.

Meanwhile, the liquid crystal alignment layer typically employs a material composed of a solvent soluble polyimide or polyamic acid. It has been described that such a material is completely imidized by post-bake to obtain the solvent resistance, and exhibits sufficient alignment properties by the rubbing process (Patent Document 3).

It has been also described that an acrylic resin including a side chain having a photodimerizing moiety such as a cinnamoyl group and a chalcone group is subjected to the polarized UV exposure to exhibit sufficient liquid crystal alignment properties (Patent Document 4).

RELATED ART DOCUMENTS

Patent Documents

Patent Document 1: Japanese Patent Application Publication No. JP-A-2000-103937
Patent Document 2: Japanese Patent Application Publication No. JP-A-2000-119472
Patent Document 3: Japanese Patent Application Publication No. JP-A-2005-037920
Patent Document 4: Japanese Patent Application Publication No. JP-A-9-118717

DISCLOSURE OF THE INVENTION

Problem to be Solved by the Invention

However, the liquid crystal alignment layer described in Patent Document 3 has low transparency for the application to the overcoat material for a color filter. The polyimide and polyamic acid are soluble in a solvent such as N-methylpyrrolidone and γ-butyrolactone, but has low solubility with respect to glycol solvents, ester solvents, and ketone solvents. Thus, it is difficult to apply the polyimide and polyamic acid to a production line of the overcoat where such a solvent is used.

In the technique providing the liquid crystal alignment properties by light exposure, the polarized UV exposure to a liquid crystal alignment layer in a common amount (for example, 100 mJ/cm$^2$) leads to a poor photodimerization rate and to insufficient cross-linkages, and consequently leads to low solvent resistance and low heat resistance. Thus, when a polymerizable liquid crystal is applied in order to form a retardation material layer on the liquid crystal alignment layer, the liquid crystal alignment layer is dissolved to exhibit insufficient alignment properties. The increase of the exposure amount to 1 J/cm$^2$ or more in order to increase the photodimerization rate improves the alignment properties of the polymerizable liquid crystal, but such a method is not practical because the exposure requires a very long time. Moreover, a material used for the related-art liquid crystal alignment layer has only the photodimerizing moiety as a cross-linking moiety. Thus, the number of the cross-linking moieties is small in the whole material, and the formed liquid crystal alignment layer has insufficient heat resistance. Hence, during a production process of a display device at 200° C. or more after the formation of the retardation material, the liquid crystal alignment layer may be significantly contracted.

The present invention has been devised in view of the above circumstances. It is an object of the present invention to provide a cured film exhibiting high solvent resistance, excellent photo-alignment performance with respect to a polymerizable liquid crystal, sufficient heat resistance, and high transparency and a composition for forming a thermoset film having photo alignment properties in order to form the film. Another object of the present invention is to provide a composition for forming a thermoset film having photo alignment properties that can be dissolved in glycol solvents, ketone solvents, or lactic acid ester solvents applicable to the formation of a cured film during the production of an overcoat for a color filter.

Means for Solving the Problem

The inventors of the present invention have carried out intensive studies in order to solve the problems and, as a result, have completed the present invention.

That is, as a first aspect, the present invention relates to a composition for forming a thermoset film having photo alignment properties, the composition including a component (A) that is an acrylic copolymer having a photodimerizing moiety and a thermal cross-linking moiety and a component (B) that is a cross-linking agent.

As a second aspect, the present invention relates to the composition for forming a thermoset film having photo alignment properties according to the first aspect, in which the component (A) is an acrylic copolymer obtained by a polymerization reaction of monomers including a monomer having a photodimerizing moiety and a monomer having a thermal cross-linking moiety.

As a third aspect, the present invention relates to the composition for forming a thermoset film having photo alignment properties according to the first aspect or the second aspect, in which the photodimerizing moiety in the component (A) is a cinnamoyl group.

As a fourth aspect, the present invention relates to the composition for forming a thermoset film having photo alignment properties according to any one of the first aspect to third aspect, in which the thermal cross-linking moiety in the component (A) is a hydroxy group.

As a fifth aspect, the present invention relates to the composition for forming a thermoset film having photo alignment properties according to any one of the first aspect to the fourth aspect, in which the cross-linking agent in the component (B) is a cross-linking agent having a methylol group or an alkoxymethylol group.

As a sixth aspect, the present invention relates to the composition for forming a thermoset film having photo alignment properties according to any one of the first aspect to the fifth aspect, the composition further including a component (C) that is an acid or a thermal acid generator.

As a seventh aspect, the present invention relates to the composition for forming a thermoset film having photo alignment properties according to any one of the first aspect to the sixth aspect, the composition further including a component (D) that is a sensitizer.

As an eighth aspect, the present invention relates to the composition for forming a thermoset film having photo alignment properties according to any one of the first aspect to the seventh aspect, in which the composition contains the component (B) in an amount of 1 to 40 part(s) by mass based on 100 parts by mass of the component (A).

As a ninth aspect, the present invention relates to the composition for forming a thermoset film having photo alignment properties according to the sixth aspect or the seventh aspect, in which the composition contains the component (B) in an amount of 1 to 40 part(s) by mass and the component (C) in an amount of 0.01 to 5 parts by mass based on 100 parts by mass of the component (A).

As a tenth aspect, the present invention relates to the composition for forming a thermoset film having photo alignment properties according to any one of the seventh aspect to the ninth aspect, in which the composition contains the component (D) in an amount of 0.1 to 20 parts by mass based on 100 parts by mass of the component (A).

As an eleventh aspect, the present invention relates to a liquid crystal alignment layer formed from the composition for forming a thermoset film having photo alignment properties as described in any one of the first aspect to the tenth aspect.

As a twelfth aspect, the present invention relates to an optical device including a liquid crystal alignment layer formed from the composition for forming a thermoset film having photo alignment properties as described in any one of the first aspect to the tenth aspect and a retardation layer on the liquid crystal alignment layer.

Effects of the Invention

The composition for forming a thermoset film having photo alignment properties of the present invention can form a cured film having high transparency, high solvent resistance, and high heat resistance as well as liquid crystal alignment performance (photo alignment properties) by photoirradiation, and thus can be used as a material for forming a liquid crystal alignment film and an overcoat having photo alignment properties. In particular, it is possible to form, in one step, a "polymerizable liquid crystal alignment layer" having both characteristics of a layer for aligning a polymerizable liquid crystal that forms a retardation material in a cell of a display and an overcoat layer for a color filter. Hence, the production process is simplified and the number of processes is reduced so that the cost reduction can be achieved.

The composition for forming a thermoset film having photo alignment properties of the present invention is soluble in glycol solvents, ketone solvents, and lactic acid ester solvents, and thus can be suitably used in a line for producing an overcoat for a color filter where such a solvent is mainly used.

BRIEF DESCRIPTION OF THE DRAWINGS

FIG. 1 shows schematic models comparing a liquid crystal cell (a) including a liquid crystal alignment film that is formed according to related art with a liquid crystal cell (b) including a color filter (CF) overcoat having alignment properties that is formed using the composition for forming a thermoset film having photo alignment properties of the present invention.

BEST MODES FOR CARRYING OUT THE INVENTION

The present invention is characterized by a performance improvement of liquid crystal alignment performance (photo alignment properties) by photoirradiation in addition to the improvements of transparency, solvent resistance, and heat resistance. That is the present invention relates to a composition for forming a thermoset film having photo alignment properties, which includes a component (A) that is an acrylic copolymer having a photodimerizing moiety and a thermal cross-linking moiety and a component (B) that is a cross-linking agent. The present invention further relates to the composition for forming a thermoset film having photo alignment properties, which may further include a component (C) that is an acid or a thermal acid generator and a component (D) that is a sensitizer in addition to the component (A) and the component (B). Here, the thermoset film having photo alignment properties is a film that induces optical anisotropy by linearly polarized light exposure and is cured by heat.

Each component will be described below in detail.

<Component (A)>

The component (A) is an acrylic copolymer having a photodimerizing moiety and a thermal cross-linking moiety.

The present invention can employ, as the acrylic copolymer, a copolymer that is obtained by polymerization of a monomer having an unsaturated double bond, such as acrylic acid esters, methacrylic acid esters, and styrenes.

The acrylic copolymer having a photodimerizing moiety and a thermal cross-linking moiety (hereinafter, also called particular copolymer), which is the component (A), may be any acrylic copolymer as long as the acrylic copolymer has such a structure, and the skeleton of the main chain, the type of a side chain, and the like of a polymer constituting the acrylic copolymer are not specifically limited.

The photodimerizing moiety is a moiety that forms a dimer by photoirradiation, and specific examples of the moiety include a cinnamoyl group, a chalcone group, a coumarin group, and an anthracene group. Among them, a cinnamoyl group having high transparency in a visible light region and high photodimerization reactivity is preferred. More preferred structures of the cinnamoyl group are shown by Formula [1] and Formula [2].

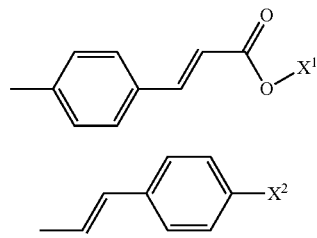

In these formulae, $X^1$ is a hydrogen atom, a $C_{1-18}$ alkyl group, a phenyl group, or a biphenyl group. The phenyl group and the biphenyl group may be substituted with a halogen atom or a cyano group. $X^2$ is a hydrogen atom, a cyano group, a $C_{1-18}$ alkyl group, a phenyl group, a biphenyl group, or a cyclohexyl group. The $C_{1-18}$ alkyl group, the phenyl group, the biphenyl group, and the cyclohexyl group may be bonded through a covalent bond, an ether bond, an ester bond, an amide bond, or a urea bond.

The thermal cross-linking moiety is a moiety that is bonded to a cross-linking agent by heat, and specific examples of the moiety include a hydroxy group, a carboxy group, and a glycidyl group.

The acrylic copolymer as the component (A) preferably has a weight average molecular weight of 3,000 to 200,000, more preferably 4,000 to 150,000, and even more preferably 5,000 to 100,000. An excessively large acrylic copolymer having a weight average molecular weight of more than 200,000 may have low solubility to a solvent to lead to poor handling properties, while an excessively small acrylic copolymer having a weight average molecular weight of less than 3,000 may lead to insufficient curing during thermal curing to reduce solvent resistance and heat resistance.

The acrylic copolymer including side chains having a photodimerizing moiety and a thermal cross-linking moiety as the component (A) as described above is simply synthesized by copolymerization of a monomer having a photodimerizing moiety and a monomer having a thermal cross-linking moiety.

Examples of the monomer having a photodimerizing moiety include a monomer having a cinnamoyl group, a chalcone group, a coumarin group, or an anthracene group. Among them, a monomer having the cinnamoyl group exhibiting good transparency in a visible light region and good photodimerization reactivity is particularly preferred.

In particular, a monomer having the cinnamoyl group of Formula [1] or Formula [2] above is more preferable. Specific examples of such a monomer are shown by Formula [3] and Formula [4].

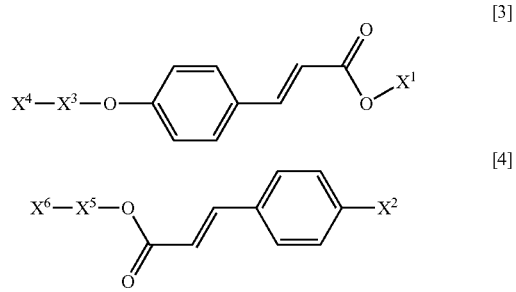

In these formulae, $X^1$ is a hydrogen atom, a $C_{1-18}$ g alkyl group, a phenyl group, or a biphenyl group. The phenyl group and the biphenyl group may be substituted with a halogen atom or a cyano group. $X^2$ is a hydrogen atom, a cyano group, a $C_{1-18}$ alkyl group, a phenyl group, a biphenyl group, or a cyclohexyl group. The $C_{1-18}$ alkyl group, the phenyl group, the biphenyl group, and the cyclohexyl group may be bonded through a covalent bond, an ether bond, an ester bond, an amide bond, or a urea bond. Each of $X^3$ and $X^5$ is independently a single bond, a $C_{1-20}$ alkylene group, an aromatic ring group, or an aliphatic ring group. The $C_{1-20}$ alkylene group may be of a branched chain or of a straight chain. Each of $X^4$ and $X^6$ is a polymerizable group. Specific examples of the polymerizable group include an acryloyl group, a methacryloyl group, a styrene group, a maleimide group, an acrylamide group, and a methacrylamide group.

Examples of the monomer having a thermal cross-linking moiety include monomers having a hydroxy group, such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy)ethyl ester, poly(ethylene glycol) ethyl ether acrylate, poly(ethylene glycol) ethyl ether methacrylate, 5-acryloyloxy-6-hydroxynorbornene-2-carboxylic-6-lactone, and 5-methacryloyloxy-6-hydroxynorbornene-2-carboxylic-6-lactone; monomers having a carboxy group, such as acrylic acid, methacrylic acid, crotonic acid, mono-(2-(acryloyloxy)ethyl) phthalate, mono-(2-(methacryloyloxy)ethyl) phthalate, N-(carboxyphenyl)maleimide, N-(carboxyphenyl)methacrylamide, and N-(carboxyphenyl)acrylamide; monomers having a phenolic hydroxy group, such as hydroxystyrene, N-(hydroxyphenyl) methacrylamide, N-(hydroxyphenyl)acrylamide, N-(hydroxyphenyl)maleimide, and N-(hydroxyphenyl)maleimide;

and monomers having a glycidyl group, such as glycidyl methacrylate and glycidyl acrylate.

In the present invention, in the production of the particular copolymer, in addition to monomers having the photodimerizing moiety and the thermal cross-linking moiety (hereinafter, also called particular functional group), a monomer that does not have the particular functional group and that can be copolymerized with the monomer may be used in combination.

Specific examples of such a monomer include an acrylic acid ester compound, a methacrylic acid ester compound, a maleimide compound, an acrylamide compound, acrylonitrile, maleic acid anhydride, a styrene compound, and a vinyl compound.

Specific examples of the monomer are shown below but are not limited to them.

Examples of the acrylic acid ester compound include methyl acrylate, ethyl acrylate, isopropyl acrylate, benzyl acrylate, naphthyl acrylate, anthryl acrylate, anthrylmethyl acrylate, phenyl acrylate, glycidyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, 2-aminoethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate.

Examples of the methacrylic acid ester compound include methyl methacrylate, ethyl methacrylate, isopropyl methacrylate, benzyl methacrylate, naphthyl methacrylate, anthryl methacrylate, anthrylmethyl methacrylate, phenyl methacrylate, glycidyl methacrylate, 2,2,2-trifluoroethyl methacrylate, tert-butyl methacrylate, cyclohexyl methacrylate, isobornyl methacrylate, 2-methoxyethyl methacrylate, methoxytriethylene glycol methacrylate, 2-ethoxyethyl methacrylate, 2-aminomethyl methacrylate, tetrahydrofurfuryl methacrylate, 3-methoxybutyl methacrylate, 2-methyl-2-adamantyl methacrylate, γ-butyrolactone methacrylate, 2-propyl-2-adamantyl methacrylate, 8-methyl-8-tricyclodecyl methacrylate, and 8-ethyl-8-tricyclodecyl methacrylate.

Examples of the vinyl compound include methyl vinyl ether, benzyl vinyl ether, vinylnaphthalene, vinylcarbazole, allyl glycidyl ether, 3-ethenyl-7-oxabicyclo[4.1.0]heptane, 1,2-epoxy-5-hexene, and 1,7-octadiene monoepoxide.

Examples of the styrene compound include styrene, methylstyrene, chlorostyrene, and bromostyrene.

Examples of the maleimide compound include maleimide, N-methylmaleimide, N-phenylmaleimide, and N-cyclohexylmaleimide.

As for the amount of each monomer to be used in order to obtain a particular polymer, it is preferable that the monomer having a photodimerizing moiety be used in an amount of 25 to 90% by mol, the monomer having a thermal cross-linking moiety be used in an amount of 10 to 75% by mol, and the monomer without a particular functional group be used in an amount of 0 to 65% by mol, based on the total amount of the whole monomers. If the monomer having a photodimerizing moiety is contained in an amount of less than 25% by mol, it is difficult to provide highly sensitive, good liquid crystal alignment properties. If the monomer having a thermal cross-linking moiety is contained in an amount of less than 10% by mol, it is difficult to provide sufficient thermosetting properties and to maintain highly sensitive, good liquid crystal alignment properties.

The method for obtaining the particular copolymer used in the present invention is not specifically limited. For example, the particular copolymer can be obtained through polymerization of monomers having the particular functional groups, a monomer without the particular functional group, if desired, a polymerization initiator, and the like in a solvent at a temperature of 50 to 110° C. At that time, any solvent can be used as long as the monomers having the particular functional groups, the monomer without the particular functional group used if desired, the polymerization initiator, and the like can be dissolved. Specific examples will be described in <Solvent> below.

The particular copolymer obtained by the method is typically in a solution state, being dissolved in a solvent.

A solution of the particular copolymer obtained by the method described above may be poured into diethyl ether, water, or the like with stirring for reprecipitation, and the formed precipitate may be filtered, washed, and then dried under ambient or reduced pressure at ambient temperature or with heat to give a powder of the particular copolymer. The operation can remove the polymerization initiator and unreacted monomers that are present along with the particular copolymer, and as a result, a powder of the purified particular copolymer can be obtained. When the polymer cannot be sufficiently purified through one operation, the obtained powder may be redissolved in a solvent and subjected to the operation repeatedly.

In the present invention, the particular copolymer may be used as the powder or as a solution in which the purified powder is dissolved in a solvent described later.

In the present invention, the particular copolymer as the component (A) may be a mixture with a plurality of types of particular copolymers.

<Component (B)>

The component (B) of the present invention is a cross-linking agent that is bonded to the thermal cross-linking moiety in the particular copolymer as the component (A). Examples of the cross-linking agent include compounds such as an epoxy compound, a methylol compound, and an isocyanate compound, and the methylol compound is preferred.

Specific examples of the methylol compound include compounds such as an alkoxymethylated glycoluril, an alkoxymethylated benzoguanamine, and an alkoxymethylated melamine.

Specific examples of the alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of commercial products include compounds such as glycoluril compounds (trade names Cymel 1170, Powderlink 1174), a methylated urea resin (trade name UFR 65), and butylated urea resins (trade names UFR 300, U-VAN 10S60, U-VAN 10R, U-VAN 11HV), manufactured by Mitsui Cytec, Ltd. and urea/formaldehyde resins (highly condensed type, trade names Beckamine J-300S, Beckamine P-955, Beckamine N) manufactured by Dainippon Ink and Chemicals, Inc.

Specific examples of the alkoxymethylated benzoguanamine include tetramethoxymethyl benzoguanamine. Examples of commercial products include a product manufactured by Mitsui Cytec, Ltd. (trade name Cymel 1123) and products manufactured by SANWA Chemical Co., Ltd. (trade names Nikalac BX-4000, Nikalac BX-37, Nikalac BL-60, Nikalac BX-55H).

Specific examples of the alkoxymethylated melamine include hexamethoxymethyl melamine. Examples of commercial products include methoxymethyl type melamine compounds (trade names Cymel 300, Cymel 301, Cymel 303, Cymel 350) and butoxymethyl type melamine compounds (trade names Mycoat 506, Mycoat 508) manufactured by Mitsui Cytec, Ltd. and methoxymethyl type melamine compounds (trade names Nikalac MW-30, Nikalac MW-22, Nikalac MW-11, Nikalac MS-001, Nikalac MX-002, Nikalac MX-730, Nikalac MX-750, Nikalac MX-035) and butoxymethyl type melamine compounds (trade names Nikalac MX-45, Nikalac MX-410, Nikalac MX-302) manufactured by SANWA Chemical.

The cross-linking agent may be a compound obtained by condensation of a melamine compound, a urea compound, a glycoluril compound, or a benzoguanamine compound in which a hydrogen atom of such an amino group is substituted by a methylol group or an alkoxymethyl group. Examples of the compound include a high molecular weight compound produced from a melamine compound or a benzoguanamine compound described in U.S. Pat. No. 6,323,310. Examples of commercial products of the melamine compound include trade name Cymel 303 (manufactured by Mitsui Cytec, Ltd.), and examples of commercial products of the benzoguanamine compound include trade name Cymel 1123 (manufactured by Mitsui Cytec, Ltd.).

As the component (B), polymers produced using acrylamide compounds or methacrylamide compounds that are substituted with a hydroxymethyl group or an alkoxymethyl group, such as N-hydroxymethylacrylamide, N-methoxymethylmethacrylamide, N-ethoxymethylacrylamide, and N-butoxymethylmethacrylamide may also be used.

Examples of such a polymer include poly(N-butoxymethylacrylamide), a copolymer of N-butoxymethylacrylamide and styrene, a copolymer of N-hydroxymethylmethacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. Such a polymer has a weight average molecular weight of 1,000 to 500,000, preferably 2,000 to 200,000, more preferably 3,000 to 150,000, and even more preferably 3,000 to 50,000.

These cross-linking agents can be used singly or in combination of two or more of them.

In the composition for forming a thermoset film having photo alignment properties of the present invention, the cross-linking agent as the component (B) is preferably contained in an amount of 1 to 40 part(s) by mass, and more preferably 5 to 30 parts by mass, based on 100 parts by mass of the particular copolymer as the component (A). The cross-linking agent that is contained in an excessively small amount reduces the solvent resistance and the heat resistance of the cured film that is obtained from the composition for forming a thermoset film having photo alignment properties and lowers the sensitivity during photo alignment. Meanwhile, the cross-linking agent that is contained in an excessively large amount may reduce the photo alignment properties and the storage stability.

<Component (C)>

In the present invention, an acid or a thermal acid generator may be contained as a component (C). The component (C) is effective on the acceleration of thermosetting reaction of the composition for forming a thermoset film having photo alignment properties of the present invention.

The component (C) is not specifically limited as long as it is a sulfonic acid group-containing compound, hydrochloric acid or a salt of hydrochloric acid, or a compound that is thermally decomposed to generate an acid during a pre-baking or post-baking process, that is, a compound that is thermally decomposed to generate an acid at a temperature from 80° C. to 250° C. Examples of such a compound include hydrochloric acid; sulfonic acids such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid; and hydrates and salts of the acids. Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methyl sulfonate), p-toluenesulfonic acid pyridinium salt, p-toluenesulfonic acid morpholinium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-tosylate, N-ethyl-4-toluenesulfonamide, and compounds shown below.

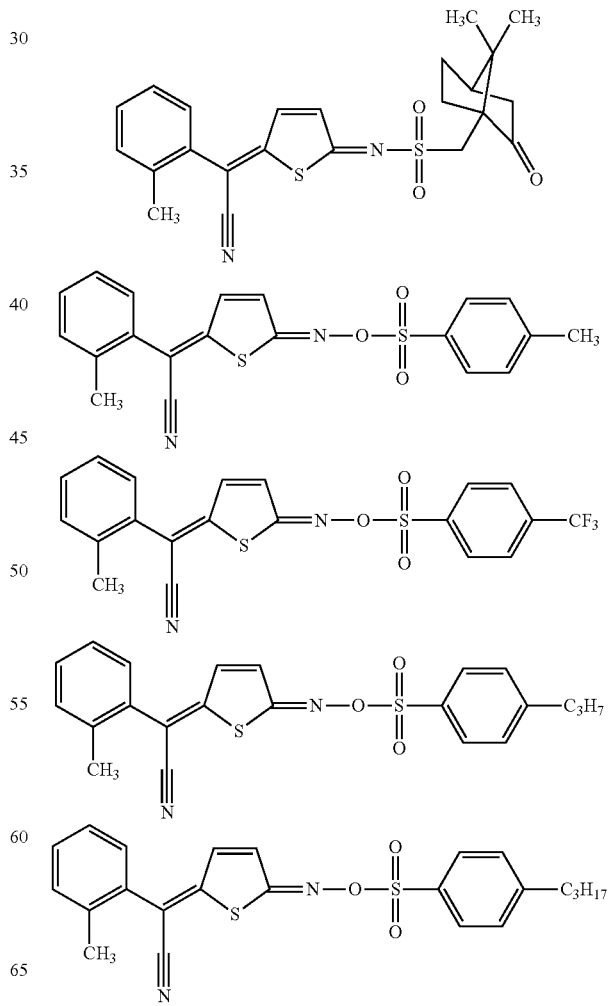

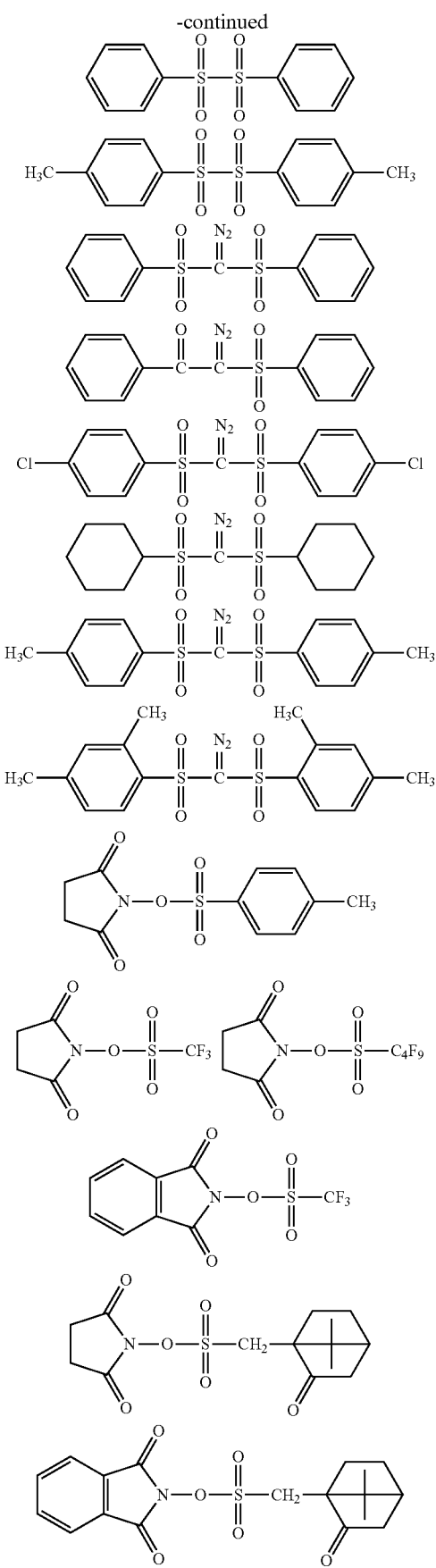
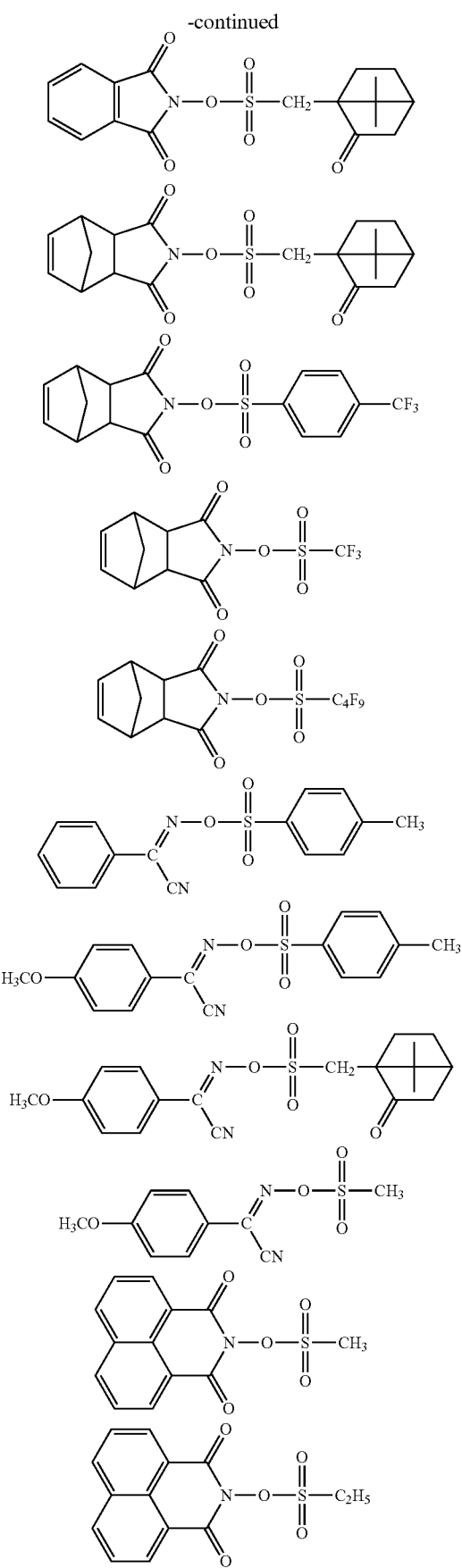

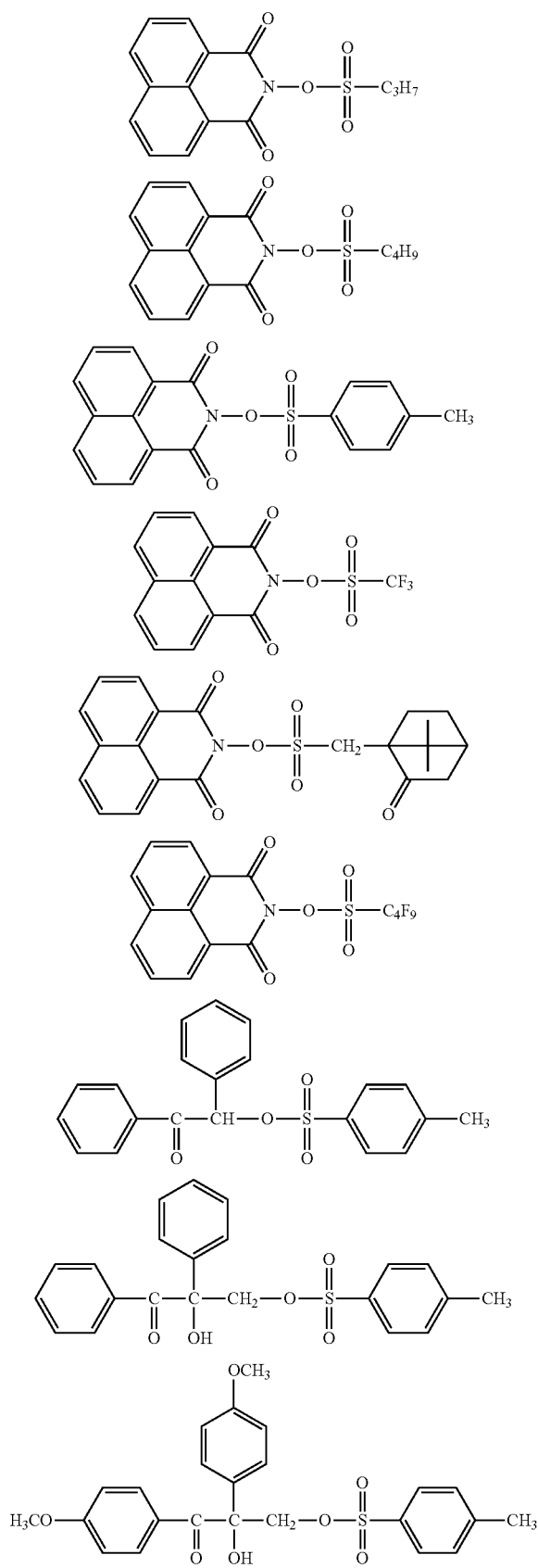

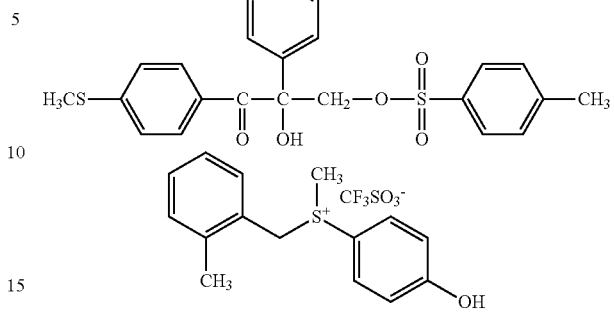

In the composition for forming a thermoset film having photo alignment properties of the present invention, the component (C) is preferably contained in an amount of 0.01 to 5 parts by mass, more preferably 0.05 to 3 parts by mass, and even more preferably 0.1 to 1 part(s) by mass, based on 100 parts by mass of the component (A). The component (C) that is contained in an amount of 0.01 parts by mass or more can provide sufficient thermosetting properties and solvent resistance as well as high sensitivity with respect to photoirradiation. However, the component (C) that is contained in an amount of more than 5 parts by mass may reduce the storage stability of the composition.

<Component (D)>

In the present invention, a sensitizer may be contained as a component (D). The component (D) is effective on the acceleration of photodimerization reaction after the formation of the thermoset film of the present invention.

Examples of the sensitizer as the component (D) include benzophenone, anthracene, anthraquinone, thioxanthone, and derivatives of them and nitrophenyl compounds. Among them, the benzophenone derivatives and the nitrophenyl compounds are preferred. Specific examples of the preferred compounds include N,N-diethylaminobenzophenone, 2-nitrofluorene, 2-nitrofluorenone, 5-nitroacenaphthene, and 4-nitrobiphenyl. In particular, N,N-diethylaminobenzophenone as a benzophenone derivative is preferred.

The sensitizer is not limited to the compounds above. These compounds can be used singly or in combination of two or more of them as the sensitizer.

In the present invention, the sensitizer as the component (D) is preferably used in a ratio of 0.1 to 20 parts by mass and more preferably 0.2 to 10 parts by mass based on 100 parts by mass of the component (A). The sensitizer that is used in an excessively small ratio may achieve insufficient effect as the sensitizer, and the sensitizer that is used in an excessively large ratio may reduce the transmittance and lead to a rough coating film.

<Solvent>

The composition for forming a thermoset film having photo alignment properties of the present invention is used mainly in a solution state, being dissolved in a solvent. The solvent used for the solution may be any solvent as long as the component (A) and the component (B), as necessary, the component (C), the component (D), and/or other additives described later can be dissolved, and the type, structure, and the like thereof are not specifically limited.

Specific examples of the solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone.

These solvents may be used singly or in combination of two or more of them. Among these solvents, propylene glycol monomethyl ether, propylene glycol monomethyl ether acetate, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate are more preferred because these solvents can be used in a line for producing an overcoat for a color filter, have good film formability, and are highly safe.

<Other Additives>

The composition for forming a thermoset film having photo alignment properties of the present invention may further include, as necessary, a silane coupling agent, a surfactant, a rheology control agent, a pigment, a dye, a storage stabilizer, a defoaming agent, an antioxidant, and the like as long as the effect of the invention is not impaired.

<Composition for Forming Thermoset Film Having Photo Alignment Properties>

The composition for forming a thermoset film having photo alignment properties of the present invention is a composition that contains the acrylic copolymer as the component (A) and the cross-linking agent as the component (B) and may contain, if desired, the acid or the thermal acid generator as the component (C), the sensitizer as the component (D), and one or more of the other additives. The composition is typically used as a solution in which these components are dissolved in a solvent.

Preferred examples of the composition for forming a thermoset film having photo alignment properties of the present invention are as below.

[1]: The composition for forming a thermoset film having photo alignment properties that contains the component (B) in an amount of 1 to 40 part(s) by mass based on 100 parts by mass of the component (A).

[2]: The composition for forming a thermoset film having photo alignment properties that contains the component (B) in an amount of 1 to 40 part(s) by mass based on 100 parts by mass of the component (A) and a solvent.

[3]: The composition for forming a thermoset film having photo alignment properties that contains the component (B) in an amount of 1 to 40 part(s) by mass, the component (C) in an amount of 0.01 to 5 parts by mass, the component (D) in an amount of 0.1 to 20 parts by mass, based on 100 parts by mass of the component (A), and a solvent.

For the composition for forming a thermoset film having photo alignment properties of the present invention to be used as a solution, the compounding ratio, preparation method, and the like are as described below in detail.

The composition for forming a thermoset film having photo alignment properties of the present invention may have any solid content ratio as long as each component is homogeneously dissolved in a solvent, and the solid content ratio is 1 to 80% by mass, preferably 3 to 60% by mass, and more preferably 5 to 40% by mass. Here, the solid content means all components of the composition for forming a thermoset film having photo alignment properties except for the solvent component.

A preparation method of the composition for forming a thermoset film having photo alignment properties of the present invention is not specifically limited. Examples of the preparation method include a method in which the component (A) is dissolved in a solvent, and to the solution, the component (B) as well as the component (C) and the component (D) are mixed in predetermined ratios to make a homogeneous solution and a method in which the other additives are, as necessary, further added and mixed in an appropriate step in the above preparation method.

In the preparation of the composition for forming a thermoset film having photo alignment properties of the present invention, a solution of the particular copolymer that is obtained by polymerization reaction in a solvent may be used as it is. In this case, to a solution of the component (A) that is obtained by copolymerization of the monomer having a photodimerizing moiety with the monomer having a thermal cross-linking moiety, the component (B), the component (C), the component (D), and the like are added to make a homogeneous solution in a similar manner to the above. At the time, a solvent may be further added in order to adjust the concentration. At the time, the solvent used in the production process of the particular copolymer may be the same as or different from the solvent that is used to adjust the concentration of the composition for forming a thermoset film having photo alignment properties.

The prepared solution of the composition for forming a thermoset film having photo alignment properties is preferably filtered using a filter having a pore size of about 0.2 μm and the like for use.

<Coated Film, Cured Film, and Liquid Crystal Alignment Layer>

The solution of the composition for forming a thermoset film having photo alignment properties as an embodiment of the present invention is applied onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate) or a film (for example, a resin film such as a triacetyl cellulose film, a polyester film, and an acrylic film) by spin coating, flood coating, roll coating, slit coating, slit coating followed by spin coating, inkjet coating, printing, and the like, and then predried (pre-baked) on a hot plate or in an oven to form a coating film. Then, the coating film is heated (post-baked) to form a cured film.

The pre-baking is carried out under conditions of heating temperature and heating time each appropriately selected from, for example, a temperature ranging from 70° C. to 160° C. and a time ranging from 0.3 to for 60 minutes. The heating temperature is preferably 80° C. to 140° C. and the heating time is preferably 0.5 to 10 minutes.

The post-baking is carried out, for example, at a heating temperature selected from a temperature ranging from 140° C. to 250° C. for 5 to 30 minutes on a hot plate or for 30 to 90 minutes in an oven.

The cured film formed using the thermosetting composition having photo alignment properties of the present invention has, for example, a film thickness of 0.1 to 30 μm, and the film thickness can be appropriately selected taking into consideration a level difference and optical and electrical characteristics of a substrate to be used.

The composition for forming a thermoset film having photo alignment properties of the present invention is cured under the conditions described above so as to form a cured film that can thoroughly cover the level difference of a substrate and that has high transparency.

The thermoset film having photo alignment properties formed in this manner is subjected to polarized UV exposure so as to function as a liquid crystal material alignment layer, namely, a layer that aligns a compound having liquid crystallinity.

As the method of polarized UV exposure, ultraviolet light having a wavelength of 150 to 450 nm is typically used, and linear polarization is applied from a perpendicular or oblique direction at room temperature or with heating.

The liquid crystal alignment layer formed from the thermoset film composition having photo alignment properties of the present invention has solvent resistance and heat resistance. Hence, the liquid crystal alignment layer is coated with a retardation material followed by heating to the phase transition temperature of a liquid crystal to make the retardation material into a liquid crystal state, and the material is photo-cured to form a layer having optical anisotropy.

Examples of the usable retardation material include a liquid crystal monomer having a polymerizable group and a composition containing the monomer. The liquid crystal alignment layer formed on a film serving as the substrate is useful as an optically anisotropic film. Such a retardation material has various alignment properties such as horizontal alignment properties, cholesteric alignment properties, perpendicular alignment properties, and hybrid alignment properties, and each material can be selectively used depending on required retardance.

Two substrates having the liquid crystal alignment layer prepared as above are laminated via a spacer such that the liquid crystal alignment layers face each other, and then a liquid crystal is poured between the substrates to prepare a liquid crystal display device having the aligned liquid crystal.

Therefore, the composition for forming a thermoset film having photo alignment properties of the present invention can be suitably used for various optically anisotropic films and liquid crystal display devices.

The composition for forming a thermoset film having photo alignment properties of the present invention is also useful as a material for forming a cured film such as a protective film and an insulating film in various displays such as a thin film transistor (TFT) liquid crystal display device and an organic EL device. In particular, the composition for forming a thermoset film having photo alignment properties of the present invention is preferred as a material for forming an overcoat material for a color filter, an interlayer insulating film for a TFT liquid crystal device, an insulating film for an organic EL device, and the like.

EXAMPLES

Hereinafter, the present invention will be described in further detail with reference to examples, but the present invention is not limited to these examples.

Abbreviations Used in Examples

Abbreviations used in Examples below are as follows.
<Acrylic Copolymer Raw Material>
CIN: 4-(6-methacryloxyhexyl-1-oxy)cinnamic acid methyl ester
HEMA: 2-hydroxyethyl methacrylate
MMA: methyl methacrylate
AIBN: α,α'-azobisisobutyronitrile
<Cross-Linking Agent>
HMM: hexamethoxymethylmelamine
TMGU: 1,3,4,6-tetrakis(methoxymethyl)glycoluril
<Acid or Thermal Acid Generator>
PTSA: p-toluenesulfonic acid monohydrate
PPTS: p-toluenesulfonic acid pyridinium salt
<Sensitizer>
DEAB: N,N'-diethylaminobenzophenone
<Solvent>
CHN: cyclohexanone
NMP: N-methyl-2-pyrrolidone
PGME: propylene glycol monomethyl ether The number average molecular weight and the weight average molecular weight of each acrylic copolymer obtained in accordance with Synthesis Examples below were determined using a GPC apparatus manufactured by JASCO Corporation (Shodex (registered trademark) columns KF 803 L and KF 804 L) while flowing tetrahydrofuran as an elution solvent at a flow rate of 1 mL/minute through a column (a column temperature of 40° C.). The number average molecular weight (hereinafter, called Mn) and the weight average molecular weight (hereinafter, called Mw) are shown in terms of polystyrene.

Synthesis Example 1

In 166.8 g of CHN, 42.0 g of CIN, 18.0 g of HEMA, and 1.3 g of AIBN as a polymerization catalyst were dissolved, and the whole was reacted at 80° C. for 20 hours to give a particular copolymer solution (a solid content concentration of 27% by mass) (P1). The obtained particular copolymer had an Mn of 8,500 and an Mw of 16,500.

Synthesis Example 2

In 32.0 g of CHN, 8.2 g of CIN, 3.5 g of HEMA, and 0.2 g of AIBN as a polymerization catalyst were dissolved, and the whole was reacted at 70° C. for 20 hours to give a particular copolymer solution (a solid content concentration of 27% by mass) (P2). The obtained particular copolymer had an Mn of 18,800 and an Mw of 44,500.

Synthesis Example 3

In 166.8 g of PGME, 42.0 g of CIN, 18.0 g of HEMA, and 1.4 g of AIBN as a polymerization catalyst were dissolved, and the whole was reacted at 90° C. for 20 hours to give a particular copolymer solution (a solid content concentration of 27% by mass) (P3). The obtained acrylic copolymer had an Mn of 4,800 and an Mw of 8,900.

Synthesis Example 4

In 166.8 g of CHN, 42.0 g of CIN, 18.0 g of MMA, and 1.3 g of AIBN as a polymerization catalyst were dissolved, and the whole was reacted at 80° C. for 20 hours to give an acrylic copolymer solution (a solid content concentration of 27% by mass) (P4). The obtained acrylic copolymer had an Mn of 8,900 and an Mw of 18,300.

Examples 1 to 6 and Comparative Examples 1 to 3

Each composition of Examples 1 to 6 and Comparative Examples 1 to 3 was prepared in accordance with the formulation as shown in Table 1, then a cured film was formed from each composition, and the solvent resistance, heat resistance, transmittance, and alignment properties were evaluated as follows.

TABLE 1

|  | Solution of component (A)* (g) | Component (B) (g) | Component (C) (g) | Component (D) (g) | Solvent (g) |
|---|---|---|---|---|---|
| Example 1 | P1 10 | HMM 0.27 | PTSA 0.014 | DEAB 0.028 | CHN 4.7 |
| Example 2 | P1 10 | TMGU 0.27 | PTSA 0.014 | DEAB 0.028 | CHN 4.7 |
| Example 3 | P1 10 | TMGU 0.27 | PPTS 0.014 | DEAB 0.028 | CHN 4.7 |
| Example 4 | P2 10 | TMGU 0.27 | PTSA 0.014 | DEAB 0.028 | CHN 4.7 |
| Example 5 | P1 10 | TMGU 0.14 | PTSA 0.014 | DEAB 0.028 | CHN 4.5 |
| Example 6 | P3 10 | TMGU 0.27 | PTSA 0.014 | DEAB 0.028 | PGME 4.7 |
| Comparative Example 1 | P1 10 | — | — | DEAB 0.028 | CHN 4.5 |
| Comparative Example 2 | P1 10 | — | PTSA 0.014 | DEAB 0.028 | CHN 3.62 |
| Comparative Example 3 | P4 10 | TMGU 0.27 | PTSA 0.014 | DEAB 0.028 | CHN 4.7 |

*P1, P2, P3: particular copolymer, P4: acrylic copolymer

[Evaluation of Solvent Resistance]

Each composition of Example 1 to Example 6 and Comparative Example 1 to Comparative Example 3 was applied onto a silicon wafer using a spin coater, and pre-baked on a hot plate at a temperature of 100° C. for 120 seconds to form a coating film having a film thickness of 1.1 μm. The film thickness was determined using F20 manufactured by FILMETRICS, Inc. The coating film was post-baked in a circulating hot air oven at a temperature of 230° C. for 30 minutes to form a cured film having a film thickness of 1.0 μm.

The cured film was immersed in CHN or NMP for 60 seconds, then dried at a temperature of 100° C. for 60 seconds, and the film thickness was measured. A film having the same film thickness as that before the immersion in CHN or NMP was evaluated as "O", and a film having a smaller film thickness than that before the immersion was evaluated as "X".

[Evaluation of Light Transmittance (Transparency)]

Each composition of Example 1 to Example 6 and Comparative Example 1 to Comparative Example 3 was applied onto a quartz substrate using a spin coater, and pre-baked on a hot plate at a temperature of 100° C. for 120 seconds to form a coating film having a film thickness of 1.0 μm. The film thickness was measured using F20 manufactured by FILMETRICS, Inc. The coating film was post-baked in a circulating hot air oven at a temperature of 230° C. for 30 minutes to form a cured film.

The transmittance of the cured film at a wavelength of 430 nm was measured using an ultraviolet-visible spectrophotometer (SHIMADZU UV-2550 manufacture by Shimadzu Corporation).

[Evaluation of Alignment Sensitivity]

Each composition of Example 1 to Example 6 and Comparative Example 1 to Comparative Example 3 was applied onto an ITO substrate using a spin coater, and pre-baked on a hot plate at a temperature of 100° C. for 120 seconds to form a coating film having a film thickness of 1.1 μm. The film thickness was measured using F20 manufactured by FILMETRICS, Inc. The film was post-baked in a circulating hot air oven at a temperature of 230° C. for 30 minutes to form a cured film.

The cured film was perpendicularly irradiated with linear polarization at 313 nm. Onto the substrate, a retardation material solution composed of a liquid crystal monomer was applied using a spin coater, and pre-baked on a hot plate at a temperature of 80° C. for 60 seconds to form a coating film having a film thickness of 1.4 μm. The substrate was irradiated with ultraviolet rays at 1,000 Mj/cm$^2$ under a nitrogen atmosphere to cure the retardation material. Here, the amount of polarized UV exposure necessary for exhibiting alignment properties was regarded as the alignment sensitivity. In order to determine that a cured film has the alignment properties, the amount of polarized UV exposure necessary for exhibiting at least alignment properties is desirable to be 100 mJ/cm$^2$ or less.

[Evaluation of Heat Resistance]

Each composition of Example 1 to Example 6 and Comparative Example 1 to Comparative Example 3 was applied onto a silicon wafer using a spin coater, and pre-baked on a hot plate at a temperature of 100° C. for 120 seconds to form a coating film having a film thickness of 1.1 μm. The film thickness was determined using F20 manufactured by FILMETRICS, Inc. The coating film was post-baked in a circulating hot air oven at a temperature of 230° C. for 30 minutes to form a cured film having a film thickness of 1.0 μm. The cured film was perpendicularly irradiated with linear polarization at 313 nm. The cured film was further baked in a circulating hot air oven at a temperature of 230° C. for 3 hours, and the residual film ratio from the post-bake was determined.

[Evaluation Result]

The results of the evaluations above are shown in Table 2.

TABLE 2

|  | Solvent resistance | | Alignment sensitivity (mJ/cm$^2$) | Heat resistance (%) | Transmittance (%) |
|---|---|---|---|---|---|
|  | CHN | NMP | | | |
| Example 1 | O | O | 30 | 95 | 92 |
| Example 2 | O | O | 30 | 95 | 92 |
| Example 3 | O | O | 30 | 95 | 91 |
| Example 4 | O | O | 30 | 95 | 92 |
| Example 5 | O | O | 30 | 95 | 92 |
| Example 6 | O | O | 30 | 95 | 92 |
| Comparative Example 1 | X | X | 800 | 60 | 92 |
| Comparative Example 2 | X | X | 800 | 60 | 93 |
| Comparative Example 3 | X | X | 800 | 60 | 92 |

The cured film formed from each composition of Examples 1 to 6 had high heat resistance and high transmittance (transparency) and had the resistance with respect to both the solvents of CHN and NMP. Each film exhibited the alignment properties by a small exposure amount.

In contrast, the cured film formed from each composition of Comparative Example 1 to Comparative Example 3 had low heat resistance and low solvent resistance and required an exposure amount 20 times larger than that for Examples in order to exhibit the alignment properties.

As described above, the cured film formed from the composition for forming a thermoset film having photo alignment properties of the present invention provided good results in any of light transmission properties, solvent resistance, heat resistance, and alignment properties.

INDUSTRIAL APPLICABILITY

The composition for forming a thermoset film having photo alignment properties according to the present invention is very useful as a material of an optically anisotropic film and a liquid crystal alignment layer for a liquid crystal display device. The composition for forming a thermoset film having photo alignment properties according to the present invention is also suitable as a material for forming a cured film such as a protective film and an insulating film in various displays such as a thin film transistor (TFT) liquid crystal display device and an organic EL device, especially as a material for forming an interlayer insulating film for a TFT liquid crystal device, an overcoat for a color filter, an insulating film for an organic EL element, for example.

The invention claimed is:

1. A composition for forming a thermoset film having photo alignment properties, the composition comprising:
   a component (A) that is an acrylic copolymer having a photodimerizing moiety and a thermal cross-linking moiety, the acrylic copolymer being a copolymer of (i) at least one monomer selected from the group consisting of hydroxyl alkyl acrylate and hydroxyl alkyl methacrylate, and (ii) at least one monomer selected from the group consisting of monomers of formula (3) and monomers of formula (4):

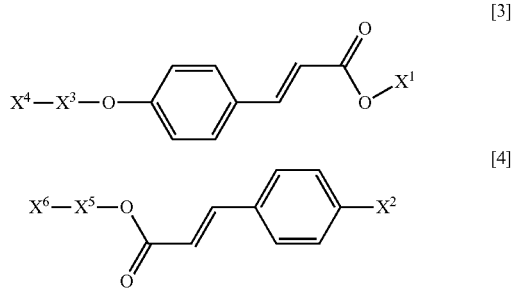

wherein:
   $X^1$ is a hydrogen atom, a $C_{1-18}$ alkyl group, a phenyl group optionally substituted with a halogen atom or a cyano group, or a biphenyl group optionally substituted with a halogen atom or a cyano group,
   $X^2$ is a hydrogen atom, a cyano group, a $C_{1-18}$ alkyl group, a phenyl group, a biphenyl group, or a cyclohexyl group, provided that the $C_{1-18}$ alkyl group, the phenyl group, the biphenyl group, and the cyclohexyl group may optionally be bonded through a covalent bond, an ether bond, an ester bond, an amide bond, or a urea bond,
   each of $X^3$ and $X^5$ is independently a single bond, a branched or straight chain $C_{1-20}$ alkylene group, an aromatic ring group, or an aliphatic ring group, and
   each of $X^4$ and $X^6$ is a polymerizable group; and
   a component (B) that is a cross-linking agent selected from the group consisting of an alkoxymethylated glycoluril; an alkoxymethylated benzoguanamine; an alkoxymethylated melamine; a compound obtained by condensation of a melamine compound, a urea compound, a glycoluril compound, or a benzoguanamine compound in which a hydrogen atom of such an amino group is substituted by a methylol group or an alkoxymethyl group; and a polymer produced using acrylamide compounds or methacrylamide compounds that are substituted with a hydroxymethyl group or an alkoxymethyl group,
   wherein the composition is curable by heating at a temperature of 70 to 160° C. for 0.3 to 60 minutes to form said thermoset film having photo alignment properties, and
   the composition exhibits photo alignment properties after exposure to perpendicular irradiation with linear polarization at 313 nm of 30 mJ/cm$^2$ or less.

2. The composition for forming a thermoset film having photo alignment properties according to claim 1, further comprising a component (C) that is an acid or a thermal acid generator.

3. The composition for forming a thermoset film having photo alignment properties according to claim 1, further comprising a component (D) that is a sensitizer.

4. The composition for forming a thermoset film having photo alignment properties according to claim 1, wherein the composition contains the component (B) in an amount of 1 to 40 part(s) by mass based on 100 parts by mass of the component (A).

5. The composition for forming a thermoset film having photo alignment properties according to claim 2, wherein the composition contains the component (B) in an amount of 1 to 40 part(s) by mass and the component (C) in an amount of 0.01 to 5 parts by mass based on 100 parts by mass of the component (A).

6. The composition for forming a thermoset film having photo alignment properties according to claim 3, wherein the composition contains the component (D) in an amount of 0.1 to 20 parts by mass based on 100 parts by mass of the component (A).

7. A liquid crystal alignment layer formed from the composition for forming a thermoset film having photo alignment properties as claimed in claim 1.

8. An optical device comprising:
   a liquid crystal alignment layer formed from the composition for forming a thermoset film having photo alignment properties as claimed in claim 1; and
   a retardation layer on the liquid crystal alignment layer.

9. The composition for forming a thermoset film having photo alignment properties according to claim 1, wherein the component B is a cross-linking agent selected from the group consisting of an alkoxymethylated glycoluril; an alkoxymethylated benzoguanamine; an alkoxymethylated melamine; a compound obtained by condensation of a melamine compound, a urea compound, a glycoluril compound, or a benzoguanamine compound in which a hydrogen atom of such an amino group is substituted by a methylol group or an alkoxymethyl group; and a polymer produced using acrylamide compounds or methacrylamide compounds that are substituted with an alkoxymethyl group.

10. The composition for forming a thermoset film having photo alignment properties according to claim 1, wherein the composition is curable by heating at a temperature of 80 to 140° C. for 0.5 to 10 minutes to form said thermoset film having photo alignment properties.

11. The composition for forming a thermoset film having photo alignment properties according to claim 1, wherein each $X^4$ and $X^6$ is independently selected from the group consisting of an acryloyl group, a methacryloyl group, a styrene group, a maleimide group, an acrylamide group, and a methacrylamide group.

12. The composition for forming a thermoset film having photo alignment properties according to claim 1, wherein the at least one monomer selected from the group consisting of hydroxyl alkyl acrylate and hydroxyl alkyl methacrylate is selected from the group consisting of 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, and 2,3-dihydroxypropyl methacrylate.

* * * * *